(12) United States Patent
Simionescu et al.

(10) Patent No.: US 10,394,673 B2
(45) Date of Patent: Aug. 27, 2019

(54) METHOD AND SYSTEM FOR HARDWARE ACCELERATED COPYBACK

(71) Applicant: Avago Technologies International Sales Pte. Limited, Singapore (SG)

(72) Inventors: Horia Simionescu, Foster City, CA (US); Timothy Hoglund, Colorado Springs, CO (US); Sridhar Rao Veerla, Bangalore (IN); Panthini Pandit, Bangalore (IN); Gowrisankar Radhakrishnan, Colorado Springs, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 13 days.

(21) Appl. No.: 15/601,073

(22) Filed: May 22, 2017

(65) Prior Publication Data

US 2018/0335963 A1 Nov. 22, 2018

(51) Int. Cl.
*G06F 12/00* (2006.01)
*G06F 11/20* (2006.01)
*G06F 11/14* (2006.01)

(52) U.S. Cl.
CPC ...... *G06F 11/2094* (2013.01); *G06F 11/1451* (2013.01); *G06F 2201/84* (2013.01)

(58) Field of Classification Search
CPC ............. G06F 11/2094; G06F 11/1451; G06F 2201/84
See application file for complete search history.

(56) References Cited

U.S. PATENT DOCUMENTS

| | | | |
|---|---|---|---|
| 7,313,721 B2 | 12/2007 | Ashmore | |
| 8,650,435 B2 | 2/2014 | Vishnu et al. | |
| 2005/0015646 A1* | 1/2005 | Okada | G06F 3/0604 714/5.1 |
| 2005/0283655 A1* | 12/2005 | Ashmore | G06F 11/004 714/6.32 |
| 2016/0188424 A1 | 6/2016 | Walls | |

* cited by examiner

*Primary Examiner* — Kalpit Parikh
(74) *Attorney, Agent, or Firm* — Sheridan Ross P.C.

(57) ABSTRACT

A system and method for performing a copyback operation are provided. The disclosed method includes initiating a copyback process to move data from an online data storage drive to a spare data storage drive by setting an indicator in hardware to divert all write completions on the online data storage drive. The method further includes, while the indicator in hardware is set to divert the write completions, incrementing on a per-strip basis a copy of data from the online data storage drive to the spare data storage drive. The method further includes only after all data from the online data storage drive has been copied to the spare data storage drive, changing the setting of the indicator in hardware so that write requests received for the online data storage drive during the copyback process are re-issued on to the spare data storage drive.

17 Claims, 5 Drawing Sheets

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| SecQueueEnable | Reserved | | NVMe MDTS Shift | | | | NotifyFWZeroCount | TimerWheelEnable | DivertWriteComp | DivertTargetComp | DivertFWInitComp | DivertTargetCmdRcvd | DivertFWTargedCmd | DivertFWInitCmd | PendI/Os |

METHOD AND SYSTEM FOR HARDWARE ACCELERATED COPYBACK

FIELD OF THE DISCLOSURE

The present disclosure is generally directed towards computer memory.

BACKGROUND

Hard disk drives have the ability to report errors when the drive begins experiencing functional issues. The errors need to be handled effectively to avoid volume degradation. Specifically, an efficient copyback operation is needed to replace the faulty (or soon to fail) drive in a volume and keep the volume optimally available to users. It is desirable to achieve a copyback process with minimal impact to ongoing Input/Output (I/O) performance or latency.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "and/or" includes any and all combinations of one or more of the associated listed items.

As will be discussed in further detail herein, a method and system are provided that enable an efficient copyback operation to avoid performance impact because of volume degradation. Having faster copyback capabilities in firmware and hardware reduces the possibility of the volume becoming degraded when errors are detected in advance. A copyback command can be processed concurrently along with incoming host read/write commands without compromising the data integrity. While copyback is in progress on a row, flush on the row is inhibited by removing the row from a dirty list, thus preventing disk data from changing and by implementing firmware-specific locking mechanisms for write through volumes.

In some embodiments, a hardware RAID manager assists with a unique flag to divert write I/O completions on given disk to firmware to perform a watermark check. The watermark indicates the region up to which the copyback operation is completed and the region on which copyback is in progress (e.g., StartLBA identifies where copyback is active and the number of blocks on which copyback is active determines the watermark). This effectively keeps data on a copyback source as well as destination drives consistent. When firmware receives the diverted write completion, the firmware performs the copyback watermark check. Depending on the results of the watermark check, the firmware completes the write request back to the RAID manager or changes destination device to the copyback destination physical device in the diverted write request and issues the same to copyback destination physical device. Once the data is written to destination physical device, a host I/O process is initiated. In the host I/O process, the RAID Manager generates multiple backend LMIDs (e.g., commands) to process the host request. Typically this would be one child LMID for each arm in the logical drive that is within the scope of the current I/O command. For example, if the I/O spans 3 strips (e.g., arm0, arm1 and arm2), then the RAID manager would generate 3 backend LMIDs that are issued to the three arms. The RAID manager would also increment the counter field in the parent LMID for each write request. The counter in the parent LMID indicates the number of backend LMIDs that are pending. Whenever a backend LMID completes, the counter is again decremented. When the counter becomes 0, the I/O is completed to host.

As an example, for all host I/Os that are received, watermark checks can be performed to determine if an additional write needs to be issued to the copyback destination drive or not. If the write (e.g., the entire region spanned by I/O) to the drive is below the watermark, then firmware may re-submit this LMID to the copyback destination drive. The firmware may modify the device handle to that of the copyback destination drive, and set a "Return to Firmware" (ReturnToFW) flag in the LMID.

Since the ReturnToFW flag is set, the RAID manager will divert this write request to firmware after the write is completed. Upon receiving the write completion for each of the write requests issued in the above step, the firmware sends a message (e.g., MSG_DECREMENT_COUNTERS) without an error bit set to decrement counter. The RAID manager decrements the counter in the parent LMID when it receives the particular message (e.g., MSG_DECREMENT_COUNTERS). When the counter becomes 0, then the parent LMID is completed to host.

If the write command (e.g., the entire region spanned by the I/O) to the drive is above the watermark, then the firmware would complete the LMID back to RAID manager by sending a MSG_DECREMENT_COUNTERS message without error status set. So when the RAID manager processes this message, it decrements parent LMID counter and if counter becomes zero, the parent LMID is completed to Host.

If the write request overlaps with the copyback region, then the write request needs to be queued. In this situation, the I/O needs to be queued behind the row lock. The row lock basically ensure that when a row lock is active, the I/Os issued to the row are queued until the row is unlocked.

When firmware of the controller receives a predictive failure status for an online drive, the firmware will select the eligible spare drive as a copyback destination drive. The copyback destination drive will not be part of the volume until the copyback operation completes. It is beneficial for firmware to complete the copyback operation faster so that the faulty drive can be removed from the volume and a runtime rebuild operation is avoided. Hence in a hardware-accelerated caching solution, it is desirable to accelerate the copyback operation also using the hardware of the controller.

In some embodiments, the hardware provides a special flag to divert all write completions on a faulty device. The firmware can set a "Divert Write Completion" flag for the faulty device. There is minor impact on incoming host I/O latency because of this diversion. This impact is negligible compared to I/O performance (or loss thereof) on rebuilding a volume in case the error is ignored.

Although embodiments of the present disclosure will be described in connection with managing a RAID architecture (e.g., a RAID-5 or RAID-6 type of architecture), it should be appreciated that embodiments of the present disclosure are not so limited. In particular, any controller that finds benefits associated with supporting variable stripe sizes can implement some or all of the functions and features described herein.

With reference to FIGS. 1-5, various embodiments of the present disclosure will be described. While many of the examples depicted and described herein will relate to a RAID architecture, it should be appreciated that embodiments of the present disclosure are not so limited. Indeed, aspects of the present disclosure can be used in any type of computing system and/or memory environment. In particular, embodiments of the present disclosure can be used in any type of memory scheme (whether employed by a RAID controller or some other type of device used in a communication system). In particular, hard drives, hard drive controllers (e.g., SCSI controllers, SAS controllers, or RAID controllers) may be configured to implement embodiments of the present disclosure. As another example, network cards or the like having cache memory may also be configured to implement embodiments of the present disclosure.

Figure 1:
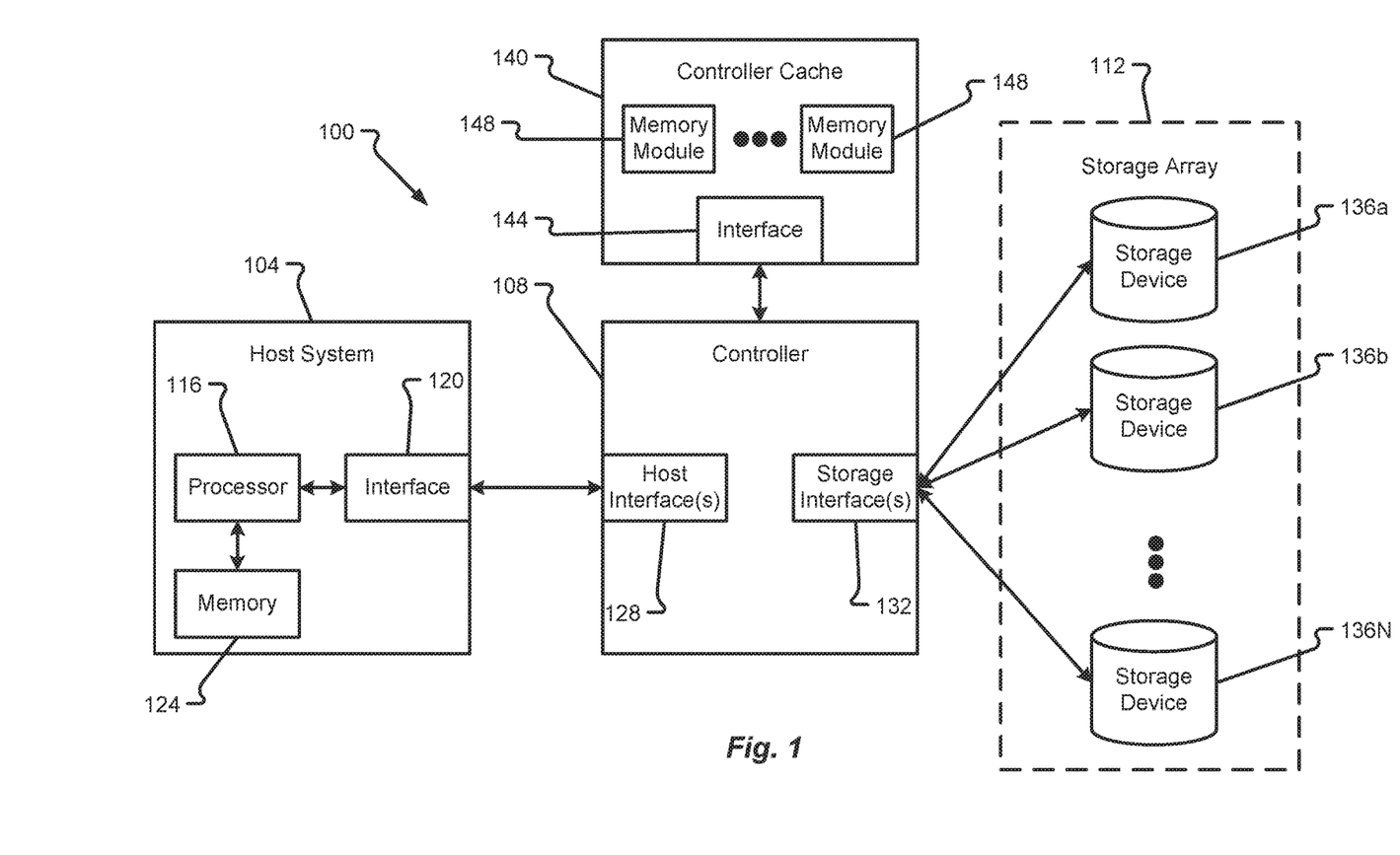
FIG. 1 is a block diagram depicting a computing system in accordance with at least some embodiments of the present disclosure.

With reference now to FIG. 1, additional details of a computing system 100 capable of implementing copyback techniques will be described in accordance with at least some embodiments of the present disclosure. The computing system 100 is shown to include a host system 104, a controller 108 (e.g., a SCSI controller, a SAS controller, a RAID controller, etc.), and a storage array 112 having a plurality of storage devices 136*a*-N therein. The system 100 may utilize any type of data storage architecture. The particular architecture depicted and described herein (e.g., a RAID architecture) should not be construed as limiting embodiments of the present disclosure. If implemented as a RAID architecture, however, it should be appreciated that any type of RAID scheme may be employed (e.g., RAID-0, RAID-1, RAID-2, . . . , RAID-5, RAID-6, etc.).

In a RAID-0 (also referred to as a RAID level 0) scheme, data blocks are stored in order across one or more of the storage devices 136*a*-N without redundancy. This effectively means that none of the data blocks are copies of another data block and there is no parity block to recover from failure of a storage device 136. A RAID-1 (also referred to as a RAID level 1) scheme, on the other hand, uses one or more of the storage devices 136*a*-N to store a data block and an equal number of additional mirror devices for storing copies of a stored data block. Higher level RAID schemes can further segment the data into bits, bytes, or blocks for storage across multiple storage devices 136*a*-N. One or more of the storage devices 136*a*-N may also be used to store error correction or parity information.

A single unit of storage can be spread across multiple devices 136*a*-N and such a unit of storage may be referred to as a stripe. A stripe, as used herein and as is well known in the data storage arts, may include the related data written to multiple devices 136*a*-N as well as the parity information written to a parity storage device 136*a*-N. In a RAID-5 (also referred to as a RAID level 5) scheme, the data being stored is segmented into blocks for storage across multiple devices 136*a*-N with a single parity block for each stripe distributed in a particular configuration across the multiple devices 136*a*-N. This scheme can be compared to a RAID-6 (also referred to as a RAID level 6) scheme in which dual parity blocks are determined for a stripe and are distributed across each of the multiple devices 136*a*-N in the array 112.

One of the functions of the controller 108 is to make the multiple storage devices 136*a*-N in the array 112 appear to a host system 104 as a single high capacity disk drive (e.g., as a storage volume). Thus, the controller 108 may be configured to automatically distribute data supplied from the host system 104 across the multiple storage devices 136*a*-N (potentially with parity information) without ever exposing the manner in which the data is actually distributed to the host system 104.

In the depicted embodiment, the host system 104 is shown to include a processor 116, an interface 120, and memory 124. It should be appreciated that the host system 104 may include additional components without departing from the scope of the present disclosure. The host system 104, in some embodiments, corresponds to a user computer, laptop, workstation, server, collection of servers, or the like. Thus, the host system 104 may or may not be designed to receive input directly from a human user.

The processor 116 of the host system 104 may include a microprocessor, central processing unit (CPU), collection of microprocessors, or the like. The memory 124 may be designed to store instructions that enable functionality of the host system 104 when executed by the processor 116. The memory 124 may also store data that is eventually written by the host system 104 to the storage array 112. Further still, the memory 124 may be used to store data that is retrieved from the storage array 112. Illustrative memory 124 devices may include, without limitation, volatile or non-volatile computer memory (e.g., flash memory, RAM, DRAM, ROM, EEPROM, etc.).

The interface 120 of the host system 104 enables the host system 104 to communicate with the controller 108 via a host interface 128 of the controller 108. In some embodiments, the interface 120 and host interface(s) 128 may be of a same or similar type (e.g., utilize a common protocol, a common communication medium, etc.) such that commands issued by the host system 104 are receivable at the controller 108 and data retrieved by the controller 108 is transmittable back to the host system 104. The interfaces 120, 128 may correspond to parallel or serial computer interfaces that utilize wired or wireless communication channels. The interfaces 120, 128 may include hardware that enables such wired or wireless communications. The communication protocol used between the host system 104 and the controller 108 may correspond to any type of known host/memory control protocol. Non-limiting examples of protocols that may be used between interfaces 120, 128 include SAS, SATA, SCSI, FibreChannel (FC), iSCSI, ATA over Ethernet, InfiniBand, or the like.

The controller 108 may provide the ability to represent the entire storage array 112 to the host system 104 as a single high volume data storage device. Any known mechanism can be used to accomplish this task. The controller 108 may help to manage the storage devices 136*a*-N (which can be hard disk drives, sold-state drives, or combinations thereof) so as to operate as a logical unit. In some embodiments, the controller 108 may be physically incorporated into the host device 104 as a Peripheral Component Interconnect (PCI) expansion (e.g., PCI express (PCI)e) card or the like. In such situations, the controller 108 may be referred to as a RAID adapter.

The storage devices 136*a*-N in the storage array 112 may be of similar types or may be of different types without departing from the scope of the present disclosure. The storage devices 136*a*-N may be co-located with one another or may be physically located in different geographical locations. The nature of the storage interface 132 may depend upon the types of storage devices 136*a*-N used in the storage array 112 and the desired capabilities of the array 112. The storage interface 132 may correspond to a virtual interface or an actual interface. As with the other interfaces described herein, the storage interface 132 may include serial or parallel interface technologies. Examples of the storage interface 132 include, without limitation, SAS, SATA, SCSI, FC, iSCSI, ATA over Ethernet, InfiniBand, or the like.

The controller 108 is shown to have communication capabilities with a controller cache 140. While depicted as being separate from the controller 108, it should be appreciated that the controller cache 140 may be integral to the controller 108, meaning that components of the controller 108 and the controller cache 140 may be contained within a single physical housing or computing unit (e.g., server blade). The controller cache 140 is provided to enable the controller 108 to perform caching operations. The controller 108 may employ caching operations during execution of I/O commands received from the host system 104. Depending upon the nature of the I/O command and the amount of information being processed during the command, the controller 108 may require a large number of cache memory modules 148 (also referred to as cache memory) or a smaller number of cache memory modules 148. The memory modules 148 may correspond to flash memory, RAM, DRAM, DDR memory, or some other type of computer memory that is quickly accessible and can be rewritten multiple times. The number of separate memory modules 148 in the controller cache 140 is typically larger than one, although a controller cache 140 may be configured to operate with a single memory module 148 if desired.

The cache interface 144 may correspond to any interconnect that enables the controller 108 to access the memory modules 148, temporarily store data thereon, and/or retrieve data stored thereon in connection with performing an I/O command or some other executable command. In some embodiments, the controller cache 140 may be integrated with the controller 108 and may be executed on a CPU chip or placed on a separate chip within the controller 108. In such a scenario, the interface 144 may correspond to a separate bus interconnect within the CPU or traces connecting a chip of the controller cache 140 with a chip executing the processor of the controller 108. In other embodiments, the controller cache 140 may be external to the controller 108 in which case the interface 144 may correspond to a serial or parallel data port.

Figure 2:
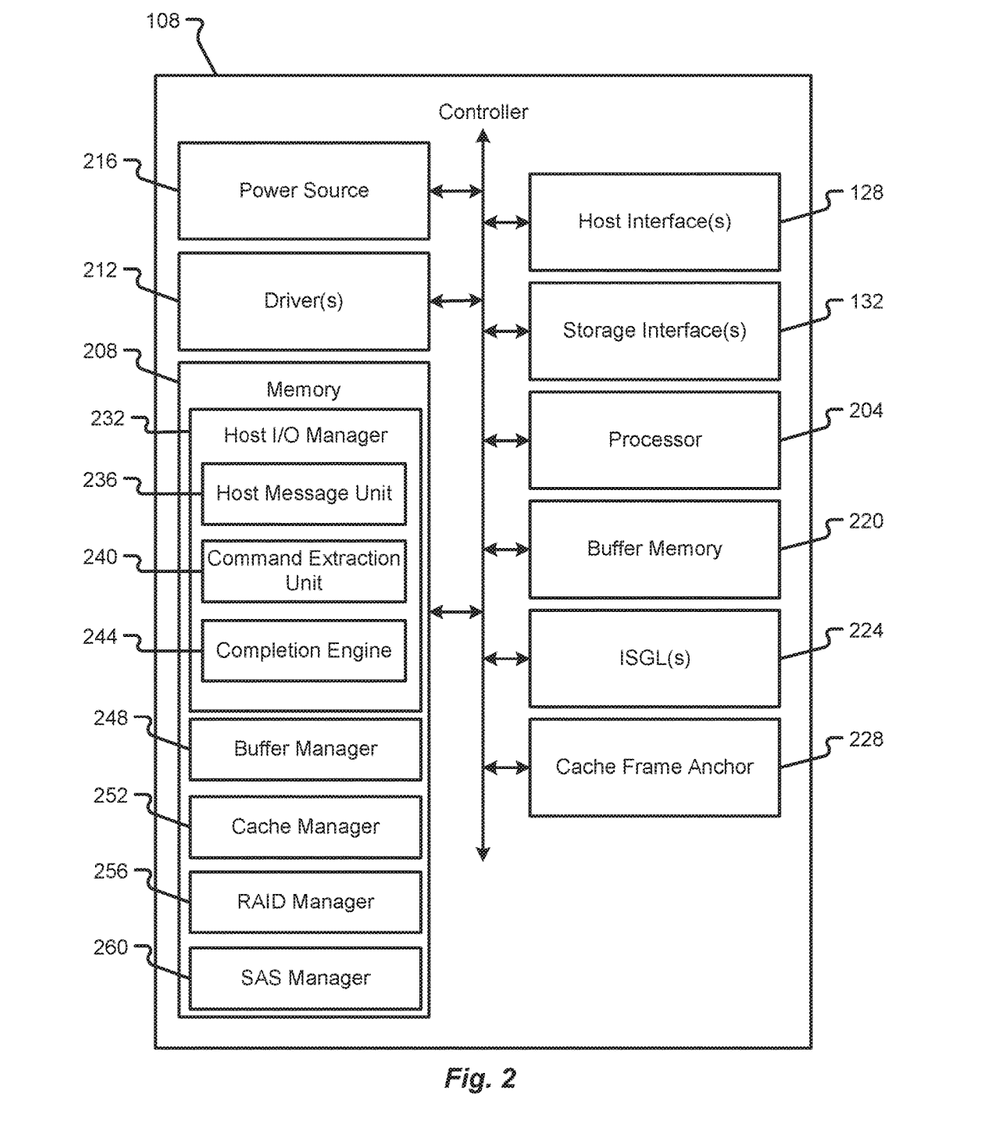
FIG. 2 is a block diagram depicting details of an illustrative controller in accordance with at least some embodiments of the present disclosure.

With reference now to FIG. 2 additional details of a controller 108 will be described in accordance with at least some embodiments of the present disclosure. The controller 108 is shown to include the host interface(s) 128 and storage interface(s) 132. The controller 108 is also shown to include a processor 204, memory 208 (e.g., a main controller memory), one or more drivers 212, and a power source 216.

The processor 204 may include an Integrated Circuit (IC) chip or multiple IC chips, a CPU, a microprocessor, or the like. The processor 204 may be configured to execute instructions in memory 208 that are shown to include a host I/O manager 232, a buffer manager 248, a cache manager 252, a RAID manager 256, and a SAS manager 260. Furthermore, in connection with performing caching or buffer functions, the processor 204 may utilize buffer memory 220, one or more Internal Scatter Gather Lists (ISGLs) 224, and a cache frame anchor 228. The host I/O manager 232 is shown to include a plurality of sub-routines that include, without limitation, a host message unit 236, a command extraction unit 240, and a completion engine 244.

Each of the components (e.g., host I/O manager 232, buffer manager 248, cache manager 252, RAID manager 256, and SAS manager 260) may correspond to different functional blocks that operate in their own local memory loading the global memory (e.g. a global buffer memory 220 or memory 208) on an as-needed basis. Each of these different functional blocks can be accelerated by different hardware threads without departing from the scope of the present disclosure. The controller 108 may be considered to have hardware and firmware components. The various manager components (e.g., host I/O manager 232, buffer manager 248, cache manager 252, RAID manager 256, and SAS manager 260) may be considered firmware components even though they can be accelerated by different hardware threads. The hardware components of the controller 108 may include drivers 212, the processor 204, the interfaces 128, 132, the controller cache 140, etc. As will be discussed in further detail herein, the hardware components and software components of the controller 108 may be enabled to communicate with one another using specialized messages (e.g., LMIDs). These messages may contain information describing operations or routines to be executed by the various components of the controller 108 as well as results of operations already performed by the controller 108.

The memory 208 may be volatile and/or non-volatile in nature. As indicated above, the memory 208 may include any hardware component or collection of hardware components that are capable of storing instructions and communicating those instructions to the processor 204 for execution. Non-limiting examples of memory 208 include RAM, ROM, flash memory, EEPROM, variants thereof, combinations thereof, and the like. Similarly, the buffer memory 220 may be volatile or non-volatile in nature. The buffer memory may be configured for multiple read/writes and may be adapted for quick access by the processor 204.

The instructions stored in memory 208 are shown to be different instruction sets, but it should be appreciated that the instructions can be combined into a smaller number of instruction sets without departing from the scope of the present disclosure. The host I/O manager 232, when executed, enable the processor 204 to manage I/O commands received from the host system 104 and facilitate higher-level communications with the host system 104. In some embodiments, the host I/O manager 232 may utilize the host message unit 236 to process incoming messages received from the host system 104. As a non-limiting example, the controller 108 may receive messages from the host system 104 in an MPI protocol. The host message unit 236 may bring down the messages received from the host system 104 and pass the content of the messages to the command extraction unit 240. The command extraction unit 240 may be configured to determine if a particular command in a message is acceleratable (e.g., capable of being passed to a particular functional block to facilitate hardware acceleration). If a command is determined to be acceleratable, then the command extraction unit 240 may implement a hardware acceleration process and generate an appropriate Local Message ID (LMID) that represents all of the information received from the host system 104 (in the command). The LMID effectively represents the command received from the host system 104, but is in a different format that is understandable by the managers 248, 252, 256, 260. The command extraction unit 240 may, in some embodiments, route the various commands (e.g., LMIDs) to one or more of the buffer manager 248, cache manager 252, RAID manager 256, and SAS manager 260. The routing of the commands may depend upon a type of the command and the function to be executed. The completion engine of the host I/O manager 232 may be responsible for reporting to the host system 104 that an I/O command has been completed by the controller 108.

The buffer manager 248 may include instructions that, when executed, enable the processor 204 to perform various buffer functions. As an example, the buffer manager 248 may enable the processor 204 to recognize a write command and utilize the buffer memory 220 in connection with executing the write command. In some embodiments, any command or function that leverages the buffer memory 220 may utilize the buffer manager 248.

The cache manager 252 may include instructions that, when executed, enable the processor 204 to perform various caching functions. As an example, the cache manager 252 may enable the processor 204 to respond to read commands or read-ahead commands. The cache manager 252 may also enable the processor 204 to communicate with the controller cache 140 and leverage the memory modules 148 of the controller cache 140. The cache manager 252 may also manage the creation and lifecycle of cache frame anchors 228 and/or ISGLs 224. As an example, as caching functions are executed, one or more cache frame anchors 228 may be created or utilized to facilitate the caching function. As used herein, an ISGL may represent the snapshot of data at a given point in time it is used. In some embodiments, the ISGL is capable of encapsulating all the metadata that is required for an I/O read/write and/or read-ahead request, thereby providing an efficient communication mechanism between various modules for processing the read/write and/or read-ahead operations.

The RAID manager 256 and/or SAS manager 260 may include instructions that, when executed, enable the processor 204 to communicate with the storage array 112 or storage devices 136 therein. In some embodiments, the RAID manager 256 and/or SAS manager 260 may receive commands either directly from the host I/O manager 232 (if no caching was needed) or they may receive commands from the cache manager 252 after an appropriate caching process has been performed. When invoked, the RAID manager 256 and/or SAS manager 260 may enable the processor 204 to finalize read or write commands and exchange data with the storage array 112.

The driver(s) 212 may comprise firmware, hardware, software, or combinations thereof that enable the processor 204 to make use of other hardware components in the controller 108. For instance, different drivers 212 may be provided to support functions of the interfaces 128, 132. As another example, separate drivers 212 may be provided to support functions of the buffer memory 220. The drivers 212 may perform the low-level routines that allow the processor 204 to communicate with the other hardware components and respond to commands received from the processor 204.

The power source 216 may correspond to hardware components that provide the controller 108 with the power necessary to run the processor 204 and other components. As an example, the power source 216 may correspond to a power converter that receives AC power from an external source (e.g., a power outlet) and converts the AC power into DC power that is useable by the other hardware components of the controller 108. Alternatively or additionally, the power source 216 may correspond to an internal power source (e.g., a battery pack, bank of capacitors, etc.) that provides power to the hardware components of the controller 108.

Figure 3:
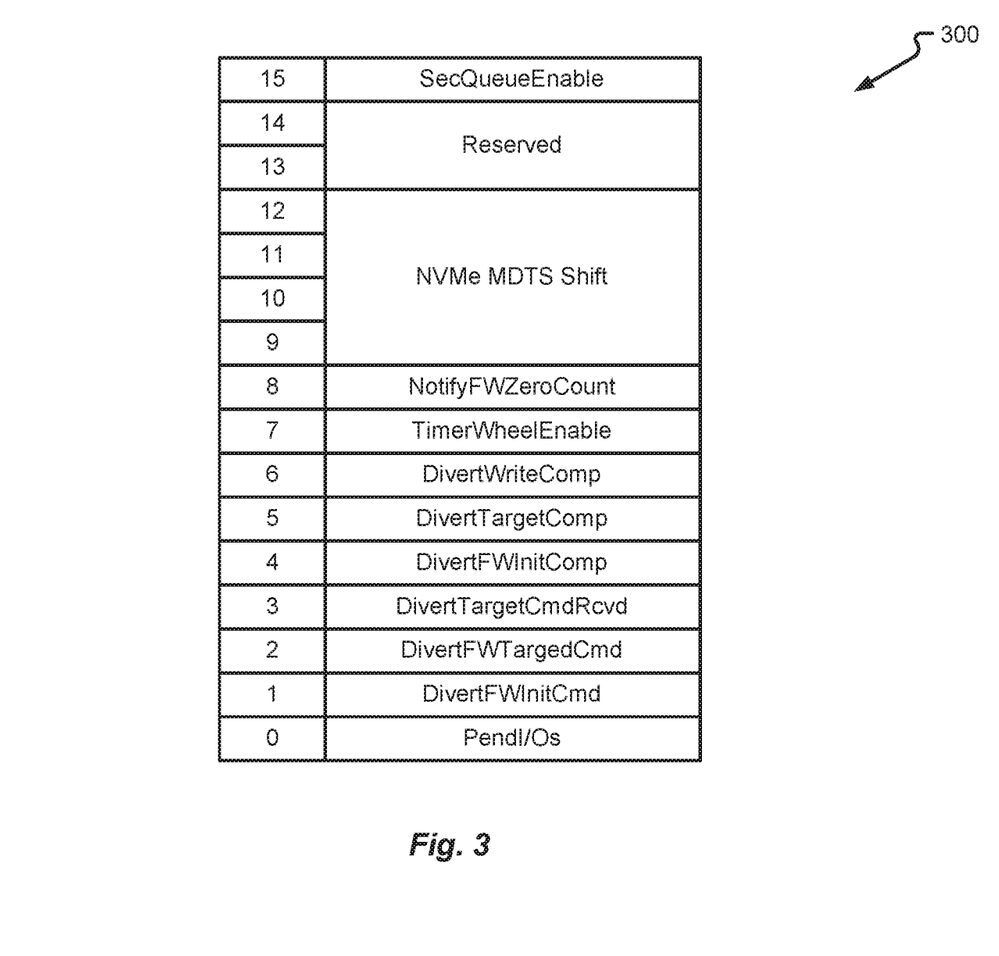
FIG. 3 is a block diagram depicting details of a data structure used in accordance with at least some embodiments of the present disclosure.

With reference now to FIG. 3, additional details of a data structure 300 will be described in accordance with at least some embodiments of the present disclosure. The data structure 300 is shown to include a number of fields that can facilitate execution of an efficient copyback operation. The data structure 300 is specifically shown to include a number of fields that can be used to contain flag values or parameter settings. The data structure 300 may be stored in memory 208, buffer memory 220, or any other memory location made available to the controller 108 or components thereof. In some embodiments, the data structure 300 may include fields that enable communications between hardware and firmware components of the controller. The fields of the data structure 300 may be configured to store simple bit values (e.g., indicating a presence or absence of a condition related to a particular flag) or multi-bit values (e.g., indicating a particular value assigned to a field).

The illustrative fields that may be provided in the data structure 300 include, without limitation, a queue enable field, a reserved field, a Non-Volatile Memory express (NVMe) shift field, a notify firmware zero count field, a timer wheel enable field, a divert write completion field, a divert target completion field, a divert firmware initiation completion field, a divert target command received field, a divert firmware target command field, a divert firmware initiation command field, and a pending I/Os field. One or more of these fields may be used in connection with executing a copyback operation as will be described in further detail herein. In some embodiments, the divert write completion field is used by the RAID manager 256 to store a bit value (single or multi-bit value) that represents a flag to divert a write completion from one location to another location. The divert write completion field may also be used to indicate that a watermark check should be performed to keep data on a copyback source as well as the destination drives consistent. The divert target command received field may indicate whether or not a command has been received by the RAID manager to divert the target device (e.g., in response to receiving an error message from the current target device). The other data fields may store information or flags consistent with the names of those fields. For instance, the queue enable field may contain a flag indicating whether or not to enable a particular queue. The divert firmware target command field may indicate whether or not a divert firmware target command has been received. Additional details and usages of the data structure 300 will be described in in further detail with reference to the flow charts of FIGS. 4 and 5.

Figure 4:
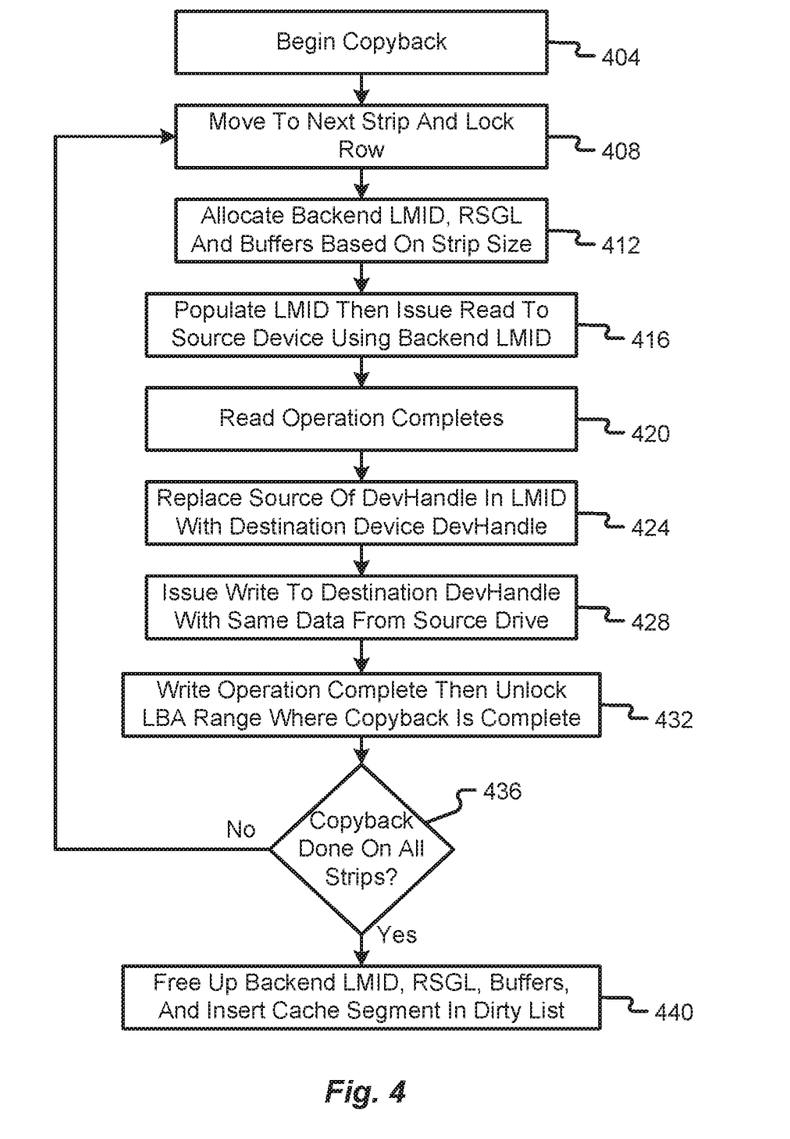
FIG. 4 is a flow diagram depicting a method of performing a copyback operation in accordance with at least some embodiments of the present disclosure.

With reference now to FIG. 4, additional details of a copyback operation will be described in accordance with at least some embodiments of the present disclosure. The method begins when a copyback operation is initiated (step 404). This operation may be initiated in response to a storage device 136 issuing a S.M.A.R.T (Self-Monitoring, Analysis and Reporting Technology) error indicating that the device 136 is expected to soon experience a failure and cause RAID volume to become unavailable or degraded. The controller firmware can take intelligent decision to avoid this situation and start a proactive copyback operation from faulty storage device 136 (which reported the S.M.A.R.T. error) to a spare storage device. The firmware can set the divert write completion flag in the data structure 300 to indicate that the device 136 has issued an error message. The firmware may also provide an identification of the failed or failing device 136 (e.g., by device identifier, LBA, etc.). Starting from LBA 0 on the device 136, the firmware starts the copyback operation on strip-by-strip basis. Sometimes it can chose to select number of LBAs that are less than a strip or it can select multiple strips. In some embodiments, the firmware may elect to start the copyback on multiple strips depending on the memory available. Accordingly, the method proceeds with the firmware locking the desired row range where the copyback is expected to start (step 408). Once the lock is granted, the firmware allocates an LMID, allocates an SGL, and buffers based on the strip size (step 412). The row is removed from a dirty list so that a flush command is not issued on the row and disk data does not change. The firmware then populates a Scatter Gather List (SGL) and further populates buffers and an LMID with the identifier of the SGL, an identifier of the failed or failing device, the number of blocks to process with the copyback, and so on (step 416).

The method proceeds with the firmware issuing the LMID to RAID Manager 256 to read data from the drive (step 420). The faulty drive data is then Direct Memory Accessed (DMAed) to buffers in the SGL. Once the data is read from the copyback source device 136, the device handle in the LMID is changed to a destination device handle and the operational code for the LMID is changed from 'read' to 'write' (step 424). The firmware then issues a write to the destination drive via the new device handle with the same data from the source drive (step 428). The LBA range where the copyback is completed may then be unlocked (step 432). It should be noted that the read or write examples mentioned above are just examples and should not be construed as limiting embodiments of the present disclosure. There could be various variants of read and write processes like Read6, Read12, Read16, Read32 and similarly Write16, Write32 etc., or different variants for SATA and NVME drives as required by the specifications for those protocols.

The firmware then determines if the copyback has been completed on all strips (step 436). If not, the method returns to step 408 and the firmware can retain the necessary resources of buffer memory, LMID, RSGL, etc. to continue with the copyback operation of subsequent strips until all data is copied. Each time a new strip is copied from the copyback source device to the new destination drive, the firmware may update a copyback watermark LBA and number of blocks that is undergoing copyback (step 440). In particular, when a write operation is completed, then the LBA range where the copyback has been completed can be unlocked for other I/O operations.

Once all strips have been processed in the copyback operation, the firmware may free up any backend LMID, SGL, and/or buffer resources (step 440). In this step, the firmware may also insert the row or strip identifier(s) into a dirty list. For instance, the firmware may insert a cache segment for the corresponding row or strip into the dirty list. The RAID manager 256 may also provide a special flag in the data structure 300 to divert all write completions on a given device. For instance, the firmware may set the divert write completion flag in RAID manager 256 for the copyback source device to help process incoming write requests appropriately.

Figure 5:
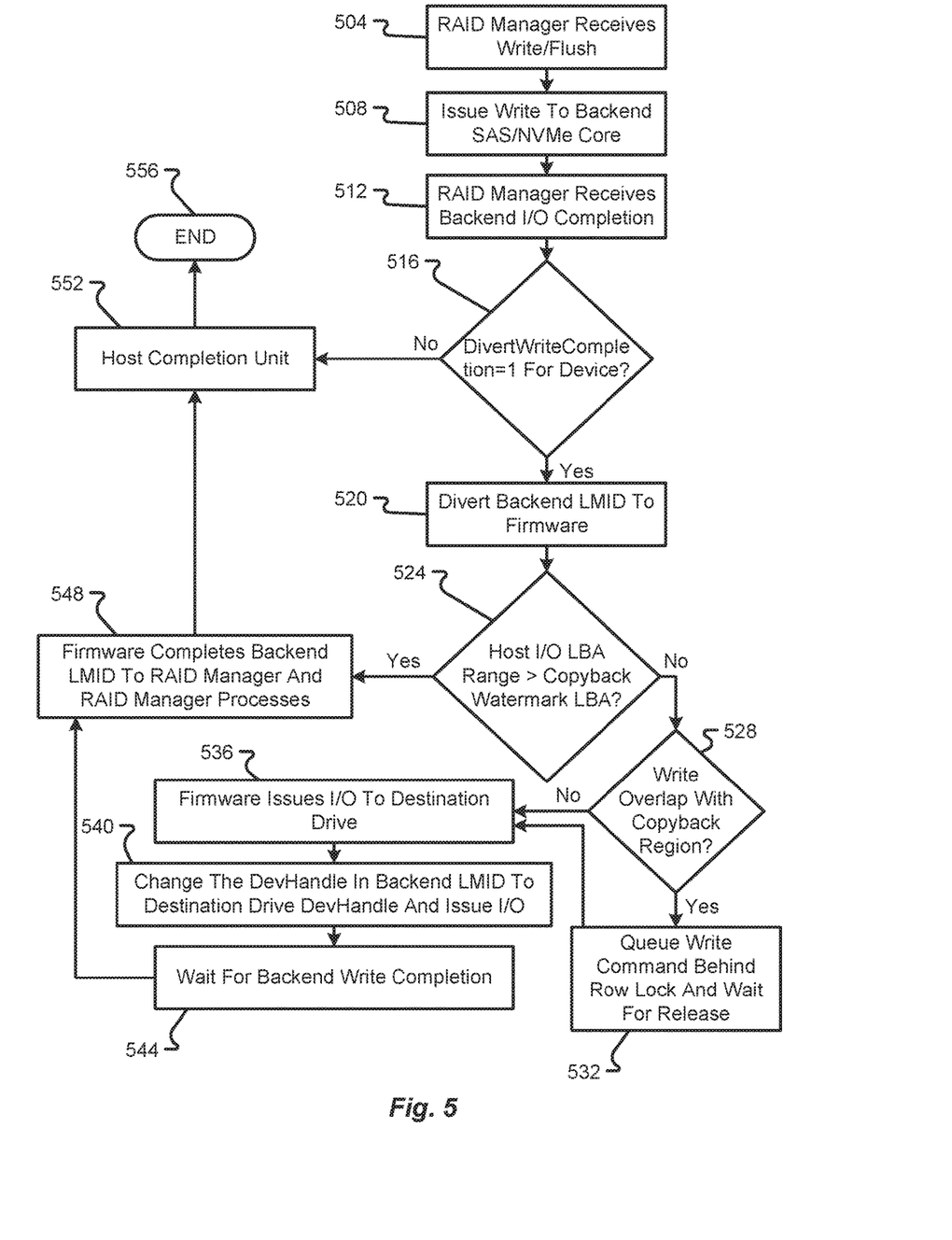
FIG. 5 is a flow diagram depicting a method of performing a flush operation during copyback in accordance with at least some embodiments of the present disclosure.

With reference now to FIG. 5, additional details of processing a write request during a copyback operation will be described in accordance with at least some embodiments of the present disclosure. A read request can be processed through the hardware in an accelerated path without being aware of copyback operation. Similarly, during copyback if a write request is received on a write back volume, the hardware of the controller 108 can perform the write operation without being aware of the copyback operation. The method will begin with the RAID manager 256 receiving a write for a write through volume or flush command (step 504). In response to receiving this command, the RAID manager 256 will issue a write to the backend SAS/NVMe core (step 508). Then RAID manager 256 waits until it receives a backend I/O completion notification (step 512).

At this point, the RAID manager 256 will determine if the divert write completion field of the data structure 300 is set for the device associated with the received write/flush command (step 516). If not, then the RAID manager 256 will send an appropriate message (e.g., an LMID) to the host completion engine 244 (step 552) to complete the method (step 556). If, however, the divert write completion field indicates there is a divert write completion bit set for the device, then the RAID manager 256 will divert the write request to firmware (step 520).

The firmware checks the I/O request against the current watermark (step 524). If the I/O LBA is above (e.g., greater than) watermark, then firmware can ignore the write completion and complete the write request to the host (steps 548 and 552). This may include transmitting the LMID to upper layers of the controller 108. The destination drive will be made consistent as part of ongoing copyback. If the I/O address is below the watermark (e.g., the copyback already completed in the specified address range), data needs to be written to destination drive to ensure data consistency (step 536). A first check is performed prior to issuing the I/O to the destination drive. Specifically, the method continues with the firmware determining if the write command overlaps with the copyback region (step 528). If not, then the method continues to step 536. If firmware detects that this write falls in the copyback region, it may pend or hold the write request until the current copyback operation is completed. Once the copyback operation is completed, the pended/held write request is re-issued on to the copyback destination drive.

In some embodiments, if copyback is performed until strip 100 and an I/O is received for strip 50, then the firmware needs to issue a write to copyback destination drive as well to keep strip 50 consistent between both the source device and the new destination target. From the diverted write request, the firmware can choose to just change the device handle instead of allocating a new one (step 540). The data written on the source (faulty) drive is already present as part of original write request so the same data can be reused to write to the copyback destination drive. Upon completion of write on the copyback destination drive, the firmware completes the write request (step 544 and 548).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for performing a hardware assisted copyback, the method comprising:
    predictively determining that an online data storage drive will experience a failure within a predetermined amount of time;
    in response to predictively determining that the online data storage drive will experience the failure, identifying a spare data storage drive as a copyback destination drive for the online data storage drive;
    initiating a copyback process to move data from the online data storage drive to the spare data storage drive, the copyback process comprising:
        setting an indicator in hardware to divert all write completions on the online data storage drive;
        while the indicator in hardware is set to divert the write completions, incrementing on a per-strip basis a copy of data from the online data storage drive to the spare data storage drive;
        only after all data from the online data storage drive has been copied to the spare data storage drive, changing the setting of the indicator in hardware so that write requests received for the online data storage drive during the copyback process are re-issued to the spare data storage drive; and
        enabling a read request to be processed through hardware for data stored on the online data storage drive in an accelerated path during the copyback process;
    locking a desired row range where the copyback is expected to start; and
    removing the desired row range from a dirty list so that a flush operation is not issued on the desired row range during the copyback process.

2. The method of claim 1, further comprising:
    allocating a Scatter Gather List (SGL);
    populating the SGL with one or more buffers for the copyback process;
    allocating a Local Message Identifier (LMID) message;
    populating the LMID message with parameters that describe an amount of buffer data needed to complete the copyback process; and
    transmitting the LMID to one or more memory management modules to enable data to be read from the online data storage drive and copied back to the spare data storage drive.

3. The method of claim 1, further comprising:
    comparing an I/O request against a watermark value that indicates a progress of the copyback process; and
    based on the comparison of the I/O request against the watermark value, determining whether or not to write data from the I/O request to the online data storage drive or the spare data storage drive.

4. The method of claim 3, wherein data from the I/O request is written to the online data storage drive during the copyback process in the event that the I/O request is above the watermark value indicating that a location for the I/O request has not yet been subject to the copyback process.

5. The method of claim 3, wherein data from the I/O request is written to the spare data storage drive instead of the online data storage drive in the event that the I/O request is below the watermark value indicating that a location for the I/O request has already been subject to the copyback process.

6. The method of claim 1, further comprising:
    determining that the copyback process has been completed on all strips of the online data storage drive; and
    releasing one or more buffers that were used for the copyback process.

7. A memory control system, comprising:
    a host interface that receives one or more host Input/Output (I/O) commands;
    a storage interface that enables communication with a plurality of storage drives configured in a storage array and enables receipt of an error message from a storage drive that has failed or is expected to fail;
    a microprocessor; and
    memory that includes computer-readable instructions that are executable by the microprocessor, the instructions including:
        instructions that identify a spare data storage drive as a copyback destination drive for the failed or failing storage drive; and
        instructions that initiate a copyback process to move data from the failed or failing storage drive to the spare data storage drive, the copyback process comprising:
            setting an indicator in hardware to divert all write completions on the online data storage drive;
            while the indicator in hardware is set to divert the write completions, incrementing on a per-strip basis a copy of data from the online data storage drive to the spare data storage drive;
            only after all data from the online data storage drive has been copied to the spare data storage drive, changing the setting of the indicator in hardware so that write requests received for the online data storage drive during the copyback process are re-issued on to the spare data storage drive; and
            enabling a read request to be processed through hardware for data stored on the online data storage drive in an accelerated path during the copyback process;
        instructions that lock a desired row range where the copyback is expected to start; and
        instructions that remove the desired row range from a dirty list so that a flush operation is not issued on the desired row range during the copyback process.

8. The system of claim 7, wherein the instructions further include:
    instructions that allocate a Scatter Gather List (SGL);
    instructions that populate the SGL with one or more buffers for the copyback process;
    instructions that allocate a Local Message Identifier (LMID) message;

instructions that populate the LMID message with parameters that describe an amount of buffer data needed to complete the copyback process; and instructions that transmit the LMID to one or more memory management modules to enable data to be read from the online data storage drive and copied back to the spare data storage drive.

9. The system of claim 7, wherein the instructions further include:
instructions that compare a I/O request against a watermark value that indicates a progress of the copyback process; and
instructions that, based on the comparison of the I/O request against the watermark value, determine whether or not to write data from the I/O request to the online data storage drive or the spare data storage drive.

10. The system of claim 9, wherein data from the I/O request is written to the online data storage drive during the copyback process in the event that the I/O request is above the watermark value indicating that a location for the I/O request has not yet been subject to the copyback process.

11. The system of claim 9, wherein data from the I/O request is written to the spare data storage drive instead of the online data storage drive in the event that the I/O request is below the watermark value indicating that a location for the I/O request has already been subject to the copyback process.

12. The system of claim 7, wherein the instructions further include:
instructions that determine that the copyback process has been completed on all strips of the online data storage drive; and
instructions that release one or more buffers that were used for the copyback process.

13. A non-transitory computer-readable medium comprising processor-executable instructions that, when executed, perform a copyback operation, the instructions comprising:
instructions that identify a spare data storage drive as a copyback destination drive for a failed or failing storage drive;
instructions that set an indicator in hardware to divert all write completions on the online data storage drive;
instructions that, while the indicated in hardware is set to divert the write completions, increment on a per-strip basis a copy of data from the online data storage drive to the spare data storage drive;
instructions that, only after all data from the online data storage drive has been copied to the spare data storage drive, change the setting of the indicator in hardware so that write requests received for the online data storage drive during the copyback process are re-issued on to the spare data storage drive;
instructions that enable a read request to be processed through hardware for data stored on the online data storage drive in an accelerated path during the copyback process;
instructions that lock a desired row range where the copyback is expected to start; and
instructions that remove the desired row range from a dirty list so that a flush operation is not issued on the desired row range during the copyback process.

14. The non-transitory computer-readable medium of claim 13, further comprising:
instructions that allocate a Scatter Gather List (SGL);
instructions that populate the SGL with one or more buffers for the copyback process;
instructions that allocate a Local Message Identifier (LMID) message;
instructions that populate the LMID message with parameters that describe an amount of buffer data needed to complete the copyback process; and
instructions that transmit the LMID to one or more memory management modules to enable data to be read from the online data storage drive and copied back to the spare data storage drive.

15. The non-transitory computer-readable medium of claim 13, further comprising:
instructions that compare a I/O request against a watermark value that indicates a progress of the copyback process; and
instructions that, based on the comparison of the I/O request against the watermark value, determine whether or not to write data from the I/O request to the online data storage drive or the spare data storage drive.

16. The non-transitory computer-readable medium of claim 15, wherein data from the I/O request is written to the online data storage drive during the copyback process in the event that the I/O request is above the watermark value indicating that a location for the I/O request has not yet been subject to the copyback process.

17. The non-transitory computer-readable medium of claim 13, further comprising:
instructions that determine that the copyback process has been completed on all strips of the online data storage drive; and
instructions that release one or more buffers that were used for the copyback process.

* * * * *